US012647323B2

(12) United States Patent
Kim et al.

(10) Patent No.: US 12,647,323 B2
(45) Date of Patent: Jun. 2, 2026

(54) SERVICE MIGRATION SYSTEM IN EDGE COMPUTING ENVIRONMENT

(71) Applicant: Foundation of Soongsil University-Industry Cooperation, Seoul (KR)

(72) Inventors: Young Han Kim, Seoul (KR); Byeong-Jun Min, Seoul (KR); Tuong Vu Xuan, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 100 days.

(21) Appl. No.: 18/811,767

(22) Filed: Aug. 22, 2024

(65) Prior Publication Data

US 2024/0422230 A1 Dec. 19, 2024

Related U.S. Application Data

(63) Continuation-in-part of application No. PCT/KR2022/095039, filed on Feb. 24, 2022.

(51) Int. Cl.
H04L 41/0897 (2022.01)
H04L 67/148 (2022.01)
(52) U.S. Cl.
CPC ........ H04L 41/0897 (2022.05); H04L 67/148 (2013.01)
(58) Field of Classification Search
CPC ....... H04L 41/08; H04L 41/0893–0897; H04L 67/148
See application file for complete search history.

(56) References Cited

U.S. PATENT DOCUMENTS

| | | | |
|---|---|---|---|
| 12,212,954 B2 * | 1/2025 | Wang | H04W 36/125 |
| 2022/0116831 A1 * | 4/2022 | Cho | H04W 8/20 |
| 2022/0124570 A1 * | 4/2022 | Skarin | H04W 36/324 |

(Continued)

FOREIGN PATENT DOCUMENTS

| | | | | |
|---|---|---|---|---|
| EP | 3457733 B1 * | 4/2022 | ............ | G06F 9/508 |
| JP | 6013981 B2 | 10/2016 | | |
| KR | 10-2013-0074952 A | 7/2013 | | |

(Continued)

OTHER PUBLICATIONS

Xuan-Tuong Vu et al, Mobility-aware Dynamic Service Placement for Multi-access Edge Computing A game theory approach, Issued on 2016.

(Continued)

*Primary Examiner* — Boris D Grijalva Lobos
(74) *Attorney, Agent, or Firm* — ZION IP; Byungwoong Park

(57) ABSTRACT

The present disclosure relates to a service migration system in an edge computing environment. Provided is a migration system comprising: a position data collection unit for collecting position data of each user terminal; a resource data collection module for collecting resource data of each edge cloud server connected to each user terminal; and a migration module for determining the necessity of migration, and performing migration, wherein the necessity of migration is determined on the basis of the service delay time, the service interruption time, and the operation costs.

7 Claims, 5 Drawing Sheets

(56) References Cited

U.S. PATENT DOCUMENTS

| | | | |
|---|---|---|---|
| 2023/0110752 A1* | 4/2023 | Wolman | ................ H04W 28/10 370/235 |
| 2024/0073799 A1* | 2/2024 | Saxena | .............. H04L 41/0895 |

FOREIGN PATENT DOCUMENTS

| | | |
|---|---|---|
| KR | 10-2015-0070929 A | 6/2015 |
| KR | 10-2015-0070930 A | 6/2015 |
| KR | 10-1557747 B1 | 10/2015 |
| KR | 10-2016-0070636 A | 6/2016 |
| KR | 10-1867487 B1 | 7/2018 |
| KR | 10-2018-0098798 A | 9/2018 |
| KR | 10-2019-0083089 A | 7/2019 |
| KR | 10-2016-0042699 A | 12/2020 |
| KR | 10-2245341 B1 | 4/2021 |
| KR | 10-2022-0062836 A | 5/2022 |

OTHER PUBLICATIONS

International Search Report for PCT/KR2022/095039 issued on Nov. 15, 2022.

* cited by examiner

10

300

Migration necessity score
calculation unit ———— 310

Migration necessity score
comparison unit ———— 320

Migration unit ———— 330

Average operation cost
calculation unit ———— 340

First operation cost
calculation unit ———— 350

Operation cost
comparison unit ———— 360

SERVICE MIGRATION SYSTEM IN EDGE COMPUTING ENVIRONMENT

The present disclosure was developed in the task of a project to develop Internet Infrastructure System Technology Development and Professional Manpower Training (Project Number: 2017001633004, Government Project Identification Number: 1711103325, Ministry name: Ministry of Science and ICT, Research Project Name: Information And Communication Broadcasting Innovation Talent training (R&D), Name of Project Management (Professional) Organization: Information and Communications Planning and Evaluation Institute, Name of Project Carrying Out Organization: Soongsil University Industry-Academic Cooperation Foundation, Contribution Rate: ½)

The present disclosure was developed in the task of a project to develop (SW Star Lab) High-speed, Automatic Service Recovery and Transfer Software Development in Hybrid Cloud Environment (Project Number: 2020000946001, Government Project Identification Number: 1711116853, Ministry name: Ministry of Science and ICT, Research Project Name: SW Computing Industry Source Technology Development (R&D), Name of Project Management (Professional) Organization: Information and Communications Planning and Evaluation Institute, Name of Project Carrying Out Organization: Soongsil University Industry-Academic Cooperation Foundation, Contribution Rate: ½)

Meanwhile, in all the aspects of the inventive concept, there is no property interest in the government of the Republic of Korea.

BACKGROUND

Embodiments of the present disclosure described herein relate to a service migration system in an edge computing environment.

Multi-access edge computing (MEC), which is a distributed edge cloud computing technology for mobile networks, may reduce the access distance to services by distributing virtualized network functions or applications to a small cloud server near the access point of a terminal, such that it is possible to improve the quality of service (QoS) and reduce operation costs through service distribution.

In the MEC environment, a service migration process that moves virtualization services between distributed edge cloud servers is essential. To determine this, the resources of the edge cloud server and user mobility must be considered.

Because each edge cloud computing server has relatively very few resources compared to a central large-capacity data center, there are limits to the virtualization applications that may run, so resource shortages may occur frequently. Thus, there is a need to move the service to another cloud server.

In addition, due to the nature of a mobile network, when a terminal moves to another edge cloud server, service access performance may be maintained by transferring the virtualization service used by the terminal to an edge cloud server that is closer than the existing edge cloud server.

Many technologies have been proposed in the past regarding the decision method and performance of service transfer between edge cloud computing servers, but most of the proposed technologies proposed a service transfer method for a single mobile terminal. However, when considering an environment where multiple mobile users use the same virtualization service at the same time, always transferring virtualization services according to the movement of individual terminals by considering the movement of multiple terminals as the movement of individual terminals as in the related art consumes edge cloud server resources inefficiently together with increased delay due to frequent service interruption.

Therefore, there is required a service transfer method that comprehensively considers the mobility of multiple terminals while optimizing the delay time that multiple terminals may perceive.

SUMMARY

An aspect of the present disclosure provides a migration system capable of determining the need to perform migration by simultaneously considering a service delay time, a service interruption time, and a system operation cost, and performing migration when necessary.

According to an aspect of the present disclosure, a migration system includes a location data collection module that collects location data of each user terminal, a resource data collection module that collects resource data of each edge cloud server connected to each user terminal, and a migration module that determines necessity of migration and performs the migration, wherein the necessity of migration is determined based on a service delay time, a service interruption time, and an operation cost.

In addition, the migration module may include a migration necessity score calculation unit that calculates a migration necessity score based on the service delay time, the service interruption time, and the operation cost in each time slot divided by a preset time period, a migration necessity score comparison unit that compares a first migration necessity score, which is a migration necessity score calculated in a first time slot, and a second migration necessity score, which is a migration necessity score calculated in a second time slot, and a migration module that performs the migration when the first migration necessity score is greater than the second migration necessity score.

In addition, the migration module may include an average operation cost calculation unit that calculates an average operation cost that is an average of operation costs available for performing the migration in each time slot, a first operation cost calculation unit that calculates a first operation cost that is an operation cost available for performing the migration in the first time slot, and an operation cost comparison unit that compares the first operation cost and the average operation cost.

In addition, the migration module may perform the migration when the first operation cost is less than the average operation cost.

In addition, the first time slot may be a most recent time slot among the time slots before current time, and the second time slot may be a most recent time slot among the time slots before start time of the first time slot.

In addition, the migration necessity score may be calculated using following Equation 1, $$P = \max\left(D^0 - \sum_{i=1}^{N} D_i(t)\right)\left(M^0 - \sum_{i=1}^{N} M_i(t)\right)\left(E^0 - \sum_{i=1}^{N} E_i(t)\right) \quad \text{[Equation 1]}$$

Wherein the P is the migration necessity score, the i is a number assigned to each user terminal, the N is a total number of user terminals, the $D^0$ is a maximum value of the service delay time in each time slot, the D is the service delay time at each user terminal when the migration is performed in each time slot, the M° is a maximum value of the service interruption time in each time slot, the M is the service interruption time at each user terminal when the migration is performed in each time slot, the E° is a maximum value of the operation cost in each time slot, and the E is the operation cost at each user terminal when the migration is performed in each time slot.

In addition, the average operation cost may be calculated using following Equation 2, $$B_{avg} = (B_{total} - B_{used})/(\text{Total number of time slots} - \qquad \text{[Equation 2]}$$

$$\text{Number of times slots that have already expired})$$

Wherein the $B_{avg}$ is the average operation cost, the $B_{total}$ is a total operation cost, and the $B_{used}$ is the operation cost already used.

In addition, the E° in Equation 1 may be set to the $B_{avg}$ in Equation 2.

According to the embodiments of the present disclosure, the migration system may determine the need to perform migration by simultaneously considering a service delay time, a service interruption time, and a system operation cost, and may perform migration when necessary.

DETAILED DESCRIPTION

Figure 1:
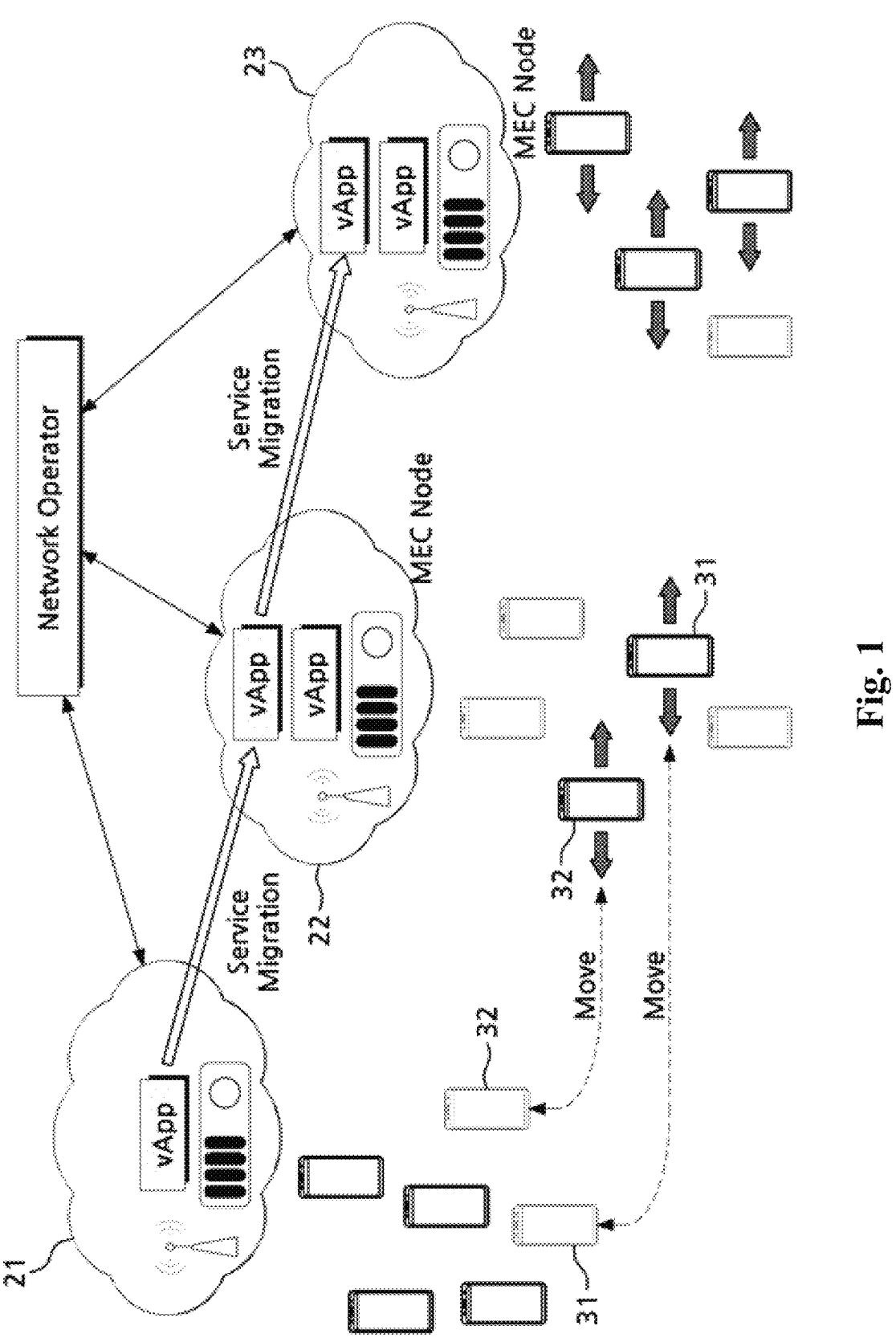
FIG. 1 is a diagram illustrating that migration is performed by moving the location of each user terminal 30, so that a second edge cloud server 22, which is a new edge cloud server, rather than a first edge cloud server 21, which is an existing edge cloud server, is connected thereto.

Hereinafter, embodiments of the present disclosure will be described in detail with reference to the accompanying drawings.

In addition, a detailed description of well-known features or functions will be ruled out in order not to unnecessarily obscure the gist of the present disclosure.

In addition, the embodiments are given to provide complete disclosure of the present disclosure and to provide thorough understanding of the present disclosure to those skilled in the art. In addition, the embodiments may be modified variously in many different forms and the technical scope of the present disclosure is not limited to the embodiments.

Rather, the embodiments are provided to make the present disclosure more faithful and complete and to completely convey the idea of the present disclosure to those skilled in the art.

In addition, the components shown in the drawings may be exaggerated for clarity and convenience of explanation.

Like reference numerals refer to like elements. As used herein, the term "and/or" includes one of listed components or various combinations thereof.

The terms used in the present specification are for explaining specific embodiments, not for limiting the present disclosure.

As used herein, a noun in singular form has the same meaning as nouns when used in plural form, unless it has a different meaning in context. In addition, as used herein, the terms "comprise" and/or "comprising" is intended to specify existence of stated feature, numbers, steps, operations, members, elements, and/or groups thereof.

It does not exclude the presence or addition of one or more other shapes, numbers, actions, members, elements and/or groups.

Hereinafter, embodiments of the present disclosure will be described in detail with reference to the accompanying drawings.

Multi-access edge computing (MEC), which is a new distributed cloud computing paradigm, may provide a useful approach to significantly improve quality of service (QoS) for mobile users, and distribute computing and data storage to edge servers to reduce operation costs.

However, in order to maintain service performance such as a service delay time, a service interruption time, and a system operation cost, it is necessary to efficiently use limited edge server resources and dynamically consider the real-time mobility of user terminals.

Therefore, a migration system 10 disclosed below may determine whether to perform migration by considering all of the service delay time, the service interruption time, and the system operation cost as described above.

FIG. 1 is a diagram illustrating that migration is performed by moving the location of each user terminal 30, so that a second edge cloud server 22, which is a new edge cloud server, rather than a first edge cloud server 21, which is an existing edge cloud server, is connected thereto.

Figure 2:
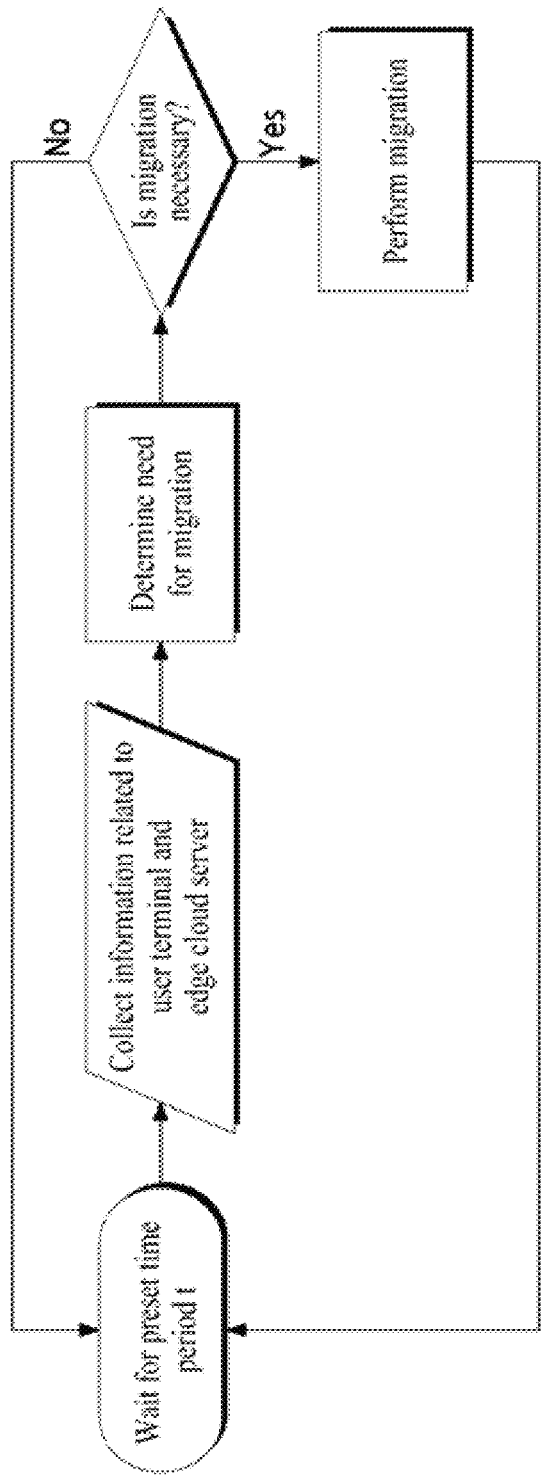
FIG. 2 is a flowchart schematically illustrating a process of performing a migration method by a migration system 10 according to an embodiment of the present disclosure.

FIG. 2 is a flowchart schematically illustrating the process of performing a migration method by the migration system 10 according to an embodiment of the present disclosure.

Referring to FIGS. 1 and 2, it may be understood that migration is performed by moving the locations of a first user terminal 31 and a second user terminal 32 connected to the first edge cloud server 21, so that migration is performed from the first edge cloud server 21 to the second edge cloud server 22.

As the location of the user terminal 30 connected to the edge cloud server 20 to use the service provided by a network operator is moved, the user terminal 30 is away from the existing first edge cloud server 21, so that the access distance to the first edge cloud server 21 increases, thereby increasing the service delay time. In this case, the user terminal 30 may include the first user terminal 31 and the second user terminal 32.

In order to solve this, the network operator may determine whether to perform service migration by which a corresponding service is migrated between the edge cloud servers 20 in consideration of the moved location of each user terminal 30 using the corresponding service and the resource status of each edge cloud server 20, and perform migration when necessary.

However, when migration is performed every time the location of the user terminal 30 moves, the data throughput for migration may increase, so the migration system 10 according to an embodiment of the present disclosure determine whether migration is necessary every preset time period t.

In addition, the migration system 10 according to an embodiment of the present disclosure determines whether migration is necessary by considering all of a service delay time, a service interruption time, and an operation cost due to migration. In this case, the service delay time and the service interruption time may be calculated based on the remaining resource status of each edge cloud server 20 collected by a resource data collection module 200.

Thus, when migration from the first edge cloud server 21 to the second edge cloud server 22 is performed due to the location movement of the first user terminal 31, the resources of the second edge cloud server 22 are used. In this case, a service delay may occur in the second user terminal 32 that is already connected to the second edge cloud server 22, and the resource data collection module 200 of the migration system 10 may check the resource status of each edge cloud server 20 and calculate the service delay time and the service interruption time to prevent such problems from occurring in advance.

Hereinafter, the migration system 10 and the migration method using the same will be described in more detail.

Figure 3:
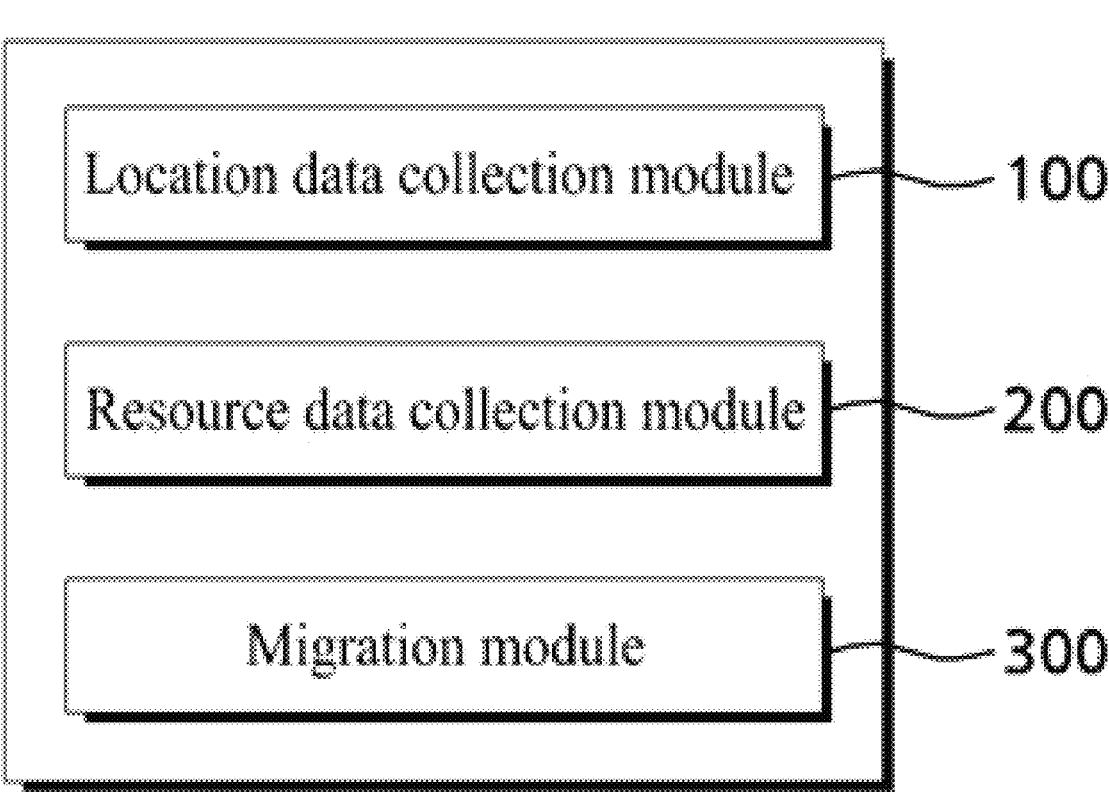
FIG. 3 is a block diagram schematically illustrating a configuration of the migration system 10 according to an embodiment of the present disclosure.

FIG. 3 is a block diagram schematically illustrating a configuration of the migration system 10 according to an embodiment of the present disclosure.

Referring to FIG. 3, the migration system 10 includes a location data collection module 100, the resource data collection module 200, and a migration module 300.

The location data collection module 100 is configured to collect location data of each user terminal 30. The resource data collection module 200 is configured to collect resource data of each edge cloud server 20 connected to each user terminal 30. The migration module 300 is configured to determine the need for migration and perform migration. In this case, the need for migration is determined based on a service delay time, a service interruption time, and an operation cost resulting from migration (hereinafter, referred to as an operation cost).

Figure 4:
FIG. 4 is a block diagram schematically illustrating a configuration of a migration module 300.

FIG. 4 is a block diagram schematically illustrating a configuration of the migration module 300.

Referring to FIG. 4, the migration module 300 may include a migration necessity score calculation unit 310, a migration necessity score comparison unit 320, and a migration unit 330.

The migration necessity score calculation unit 310 may be configured to calculate a migration necessity score based on the service delay time, the service interruption time, and the operation cost in each time slot divided by a preset time period.

According to one example, when the migration necessity score calculation unit 310 calculates the migration necessity score based on the service delay time, the service interruption time, and the operation cost during the time from 00:00 to 01:00, the preset time period may be set to 1 minute, in which case a total of 60 time slots may be generated.

The migration necessity score calculated by the migration necessity score calculation unit 310 may be calculated using the following Equation 1.

$$P = \max\left(D^0 - \sum_{i=1}^{N} D_i(t)\right)\left(M^0 - \sum_{i=1}^{N} M_i(t)\right)\left(E^0 - \sum_{i=1}^{N} E_i(t)\right)$$ [Equation 1]

Where the 'P' is the migration necessity score, the "i" is a number assigned to each user terminal, the "N" is a total number of user terminals, the Do is a maximum value of the service delay time in each time slot, the "D" is the service delay time at each user terminal when the migration is performed in each time slot, the Mo is a maximum value of the service interruption time in each time slot, the "M" is a service interruption time at each user terminal when the migration is performed in each time slot, the Eo is a maximum value of the operation cost in each time slot, and the "E" is the operation cost at each user terminal when the migration is performed in each time slot.

When the migration necessity score is calculated, the service delay time and the service interruption time may vary depending on the location of each user terminal 30 collected by the location data collection module 100, the resource of each edge cloud server 20 collected by the resource data collection module 200, the distance between each user terminal 30 and each edge cloud server 20, and the bandwidth of the edge cloud server 20, and the like.

The migration necessity score comparison unit 320 may be configured to compare the first migration necessity score, which is the migration necessity score calculated in the first time slot, and the second migration necessity score, which is the migration necessity score calculated in the second time slot.

In this case, the first time slot may be the most recent time slot among time slots before the current time, and the second time slot may be the most recent time slot among time slots before the time the first time slot starts.

For example, when the current time is 00:30, the first time slot is from 00:29 to 00:30, which is the most recent time slot among time slots before 00:30, which is the current time, and the second time slot is from 00:28 to 00:29, which is the most recent time slot among time slots before 00:29, which is the start time of the first time slot.

Therefore, the migration necessity score comparison unit 320 may compare the migration necessity score calculated in the first time slot corresponding to 00:29 to 00:30 and the migration necessity score calculated in the second time slot corresponding to 00:28 to 00:29.

The migration unit 330 may be configured to perform migration when the first migration necessity score is greater than the second migration necessity score.

Referring again to FIG. 4, the migration module 300 may further include an average operation cost calculation unit 340, a first operation cost calculation unit 350, and an operation cost comparison unit 360.

The average operation cost calculation unit 340 may be configured to calculate the average operation cost, which is the average of the operation costs available to perform migration in each time slot.

Figure 5:
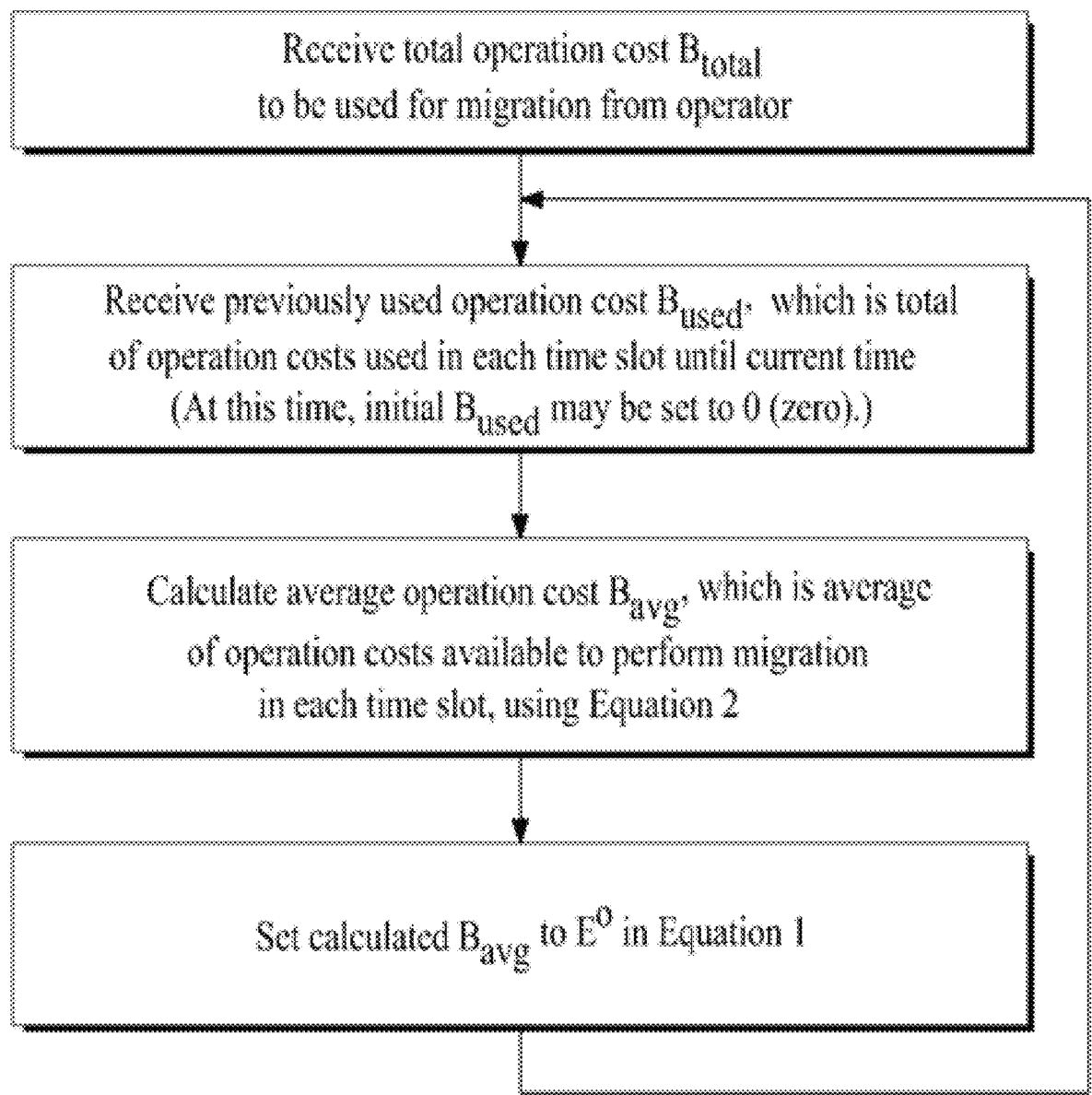
FIG. 5 is a flowchart illustrating a process of calculating an average operation cost by the average operation cost calculation unit 340.

FIG. 5 is a flowchart illustrating a process of calculating an average operation cost by the average operation cost calculation unit 340.

Referring to FIG. 5, the average operation cost calculation unit 340 receives a total operation cost $B_{total}$ to be used for migration from an operator of the migration system 10. Then, the previously used operation cost $B_{used}$, which is the total of the operation costs used in each time slot until the current time, is input. In this case, the initial $B_{used}$ may be set to '0 (zero)'. Next, the average operation cost $B_{avg}$, which is the average of the operation costs available to perform migration in each time slot, is calculated.

The average operation cost $B_{avg}$ may be calculated using following Equation 2.

$$B_{avg} = (B_{total} - B_{used})/(\text{Total number of time slots} -$$ [Equation 2]

Number of times slots that have already expired)

Where the $B_{avg}$ is an average operation cost, and the $B_{total}$ is a total operation cost.

Finally, the $B_{avg}$ calculated by Equation 2 is set to the $E°$ in Equation 1 described above.

Referring again to FIG. 4, the first operation cost calculation unit 350 may be configured to calculate the first operation cost, which is the operation cost used to perform migration in the first time slot. That is, the first operation cost refers to the total operation cost used by each user terminal 30 when migration is performed in the first time slot.

The operation cost comparison unit 360 may be configured to compare the first operation cost and the average operation cost.

When the migration module 300 includes the average operation cost calculation unit 340, the first operation cost calculation unit 350, and the operation cost comparison unit 360, the operation cost comparison unit 360 may be configured to determine whether the first operation cost calculated by the first operation cost calculation unit 350 is less than the average operation cost calculated by the average operation cost calculation unit 340, and the migration unit 330 may be configured to perform migration only when the operation cost comparison unit 360 determines that the first operation cost is less than the average operation cost.

That is, the migration module 300 may further include the average operation cost calculation unit 340, the first operation cost calculation unit 350, and the operation cost comparison unit 360 in addition to the migration necessity score calculation unit 310, and the migration necessity score comparison unit 320, and the migration unit 330 may be configured to perform migration only when it is determined that the first operation cost is greater than the second migration necessity score and at the same time, it is determined that the first operation cost is less than the average operation cost.

According to the embodiments of the present disclosure, the migration system 10 may determine the need to perform migration by simultaneously considering the service delay time, the service interruption time, and the system operation cost, and may perform migration when necessary.

Although the present disclosure has been described above through embodiments, the above embodiments are merely for illustrating the spirit of the present disclosure and are not limited thereto. Those skilled in the art will understand that various modifications may be made to the above-described embodiments. The scope of the present disclosure is determined only through interpretation of the appended claims.

Although the present disclosure has been described above through embodiments, the above embodiments are merely for illustrating the spirit of the present disclosure and are not limited thereto. Those skilled in the art will understand that various modifications may be made to the above-described embodiments. The scope of the present disclosure is determined only through interpretation of the appended claims.

The invention claimed is:

1. A migration system comprising:

at least one processor; and at least one memory device being communicatively coupled to the processor, wherein the at least one memory device stores instructions operable when executed by the at least one processor to perform:

collecting location data of each user terminal;

collecting resource data of each edge cloud server connected to each user terminal; and determining necessity of migration and perform the migration, wherein the necessity of migration is determined based on a service delay time, a service interruption time, and an operation cost, and wherein the at least one memory device stores instructions operable when executed by the at least one processor to further perform:

calculating a migration necessity score based on the service delay time, the service interruption time, and the operation cost in each time slot divided by a preset time period;

comparing a first migration necessity score, which is a migration necessity score calculated in a first time slot, and a second migration necessity score, which is a migration necessity score calculated in a second time slot; and performing the migration when the first migration necessity score is greater than the second migration necessity score.

2. The migration system of claim 1, wherein the at least one memory device stores instructions operable when executed by the at least one processor to further perform:

calculating an average operation cost that is an average of operation costs available for performing the migration in each time slot;

calculating a first operation cost that is an operation cost available for performing the migration in the first time slot; and comparing the first operation cost and the average operation cost.

3. The migration system of claim 2, wherein the at least one memory device stores instructions operable when executed by the at least one processor to further perform the migration when the first operation cost is less than the average operation cost.

4. The migration system of claim 3, wherein the first time slot is a most recent time slot among the time slots before current time, and the second time slot is a most recent time slot among the time slots before start time of the first time slot.

5. The migration system of claim 4, wherein the migration necessity score is calculated using following Equation 1, $$P = \max\left(D^0 - \sum_{i=1}^{N} D_i(t)\right)\left(M^0 - \sum_{i=1}^{N} M_i(t)\right)\left(E^0 - \sum_{i=1}^{N} E_i(t)\right) \quad \text{[Equation 1]}$$

wherein the P is the migration necessity score, the i is a number assigned to each user terminal, the N is a total number of user terminals, the Do is a maximum value of the service delay time in each time slot, the D is the service delay time at each user terminal when the migration is performed in each time slot, the Mo is a maximum value of the service interruption time in each time slot, the M is the service interruption time at each user terminal when the migration is performed in each time slot, the Eo is a maximum value of the operation cost in each time slot, and the E is the operation cost at each user terminal when the migration is performed in each time slot.

6. The migration system of claim 5, wherein the average operation cost is calculated using following Equation 2, $$B_{avg} = (B_{total} - B_{used})/(\text{Total number of time slots} - \quad \text{[Equation 2]}$$

Number of times slots that have already expired)

5 wherein the $B_{avg}$ is the average operation cost,
the $B_{total}$ is a total operation cost, and
the $B_{used}$ is the operation cost already used.
7. The migration system of claim 6, wherein the $E°$ in
Equation 1 is set to the $B_{avg}$ in Equation 2.

10

\* \* \* \* \*